United States Patent [19]

Herrstrom

[11] Patent Number: 4,737,048
[45] Date of Patent: Apr. 12, 1988

[54] RESILIENT SIGN POST ATTACHMENT

[76] Inventor: Timothy J. Herrstrom, 605 W. Fifth St., Madrid, Iowa 50156

[21] Appl. No.: 67,162

[22] Filed: Jun. 29, 1987

[51] Int. Cl.$^4$ ................................................ F16D 1/00
[52] U.S. Cl. ...................................... 403/229; 403/2; 403/291; 40/608
[58] Field of Search ............................ 403/2, 229, 291; 404/10; 248/622, 623, 599, 600, 160; 40/608; 52/113

[56] References Cited

U.S. PATENT DOCUMENTS

| 2,949,324 | 8/1960 | Birge et al. | |
|---|---|---|---|
| 3,875,720 | 4/1975 | Russell. | |
| 4,033,536 | 7/1977 | Hillstrom | 40/608 |
| 4,161,723 | 7/1979 | DeVittori. | |
| 4,341,488 | 7/1982 | Ryan. | |
| 4,636,109 | 1/1987 | Clausen et al. | |

FOREIGN PATENT DOCUMENTS 1382428 11/1964 France ................................ 52/113

Primary Examiner—Andrew V. Kundrat
Attorney, Agent, or Firm—Henderson & Sturm

[57] ABSTRACT

A road sign attachment and repair apparatus having first and second U-shaped brackets adapted to be attached to a wooden sign post near the bottom thereof to form a resilient joint or to form such resilient joint at a place where a wooden sign post has been broken off. Four coil springs are attached to one of the U-shaped brackets at one end thereof and to the other U-shaped bracket at the other end thereof.

2 Claims, 2 Drawing Sheets

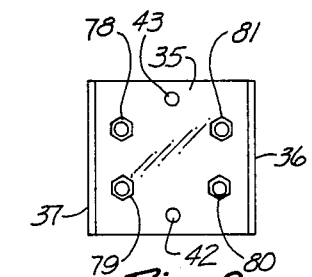
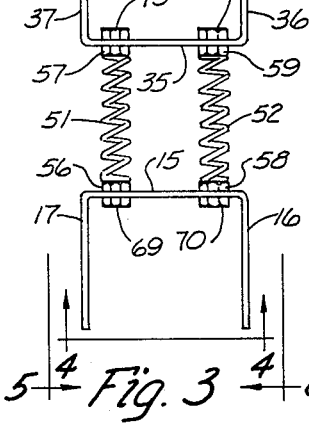
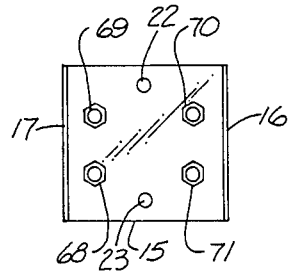
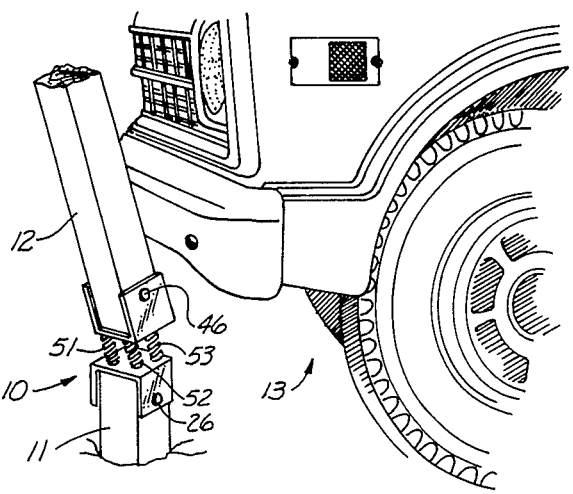
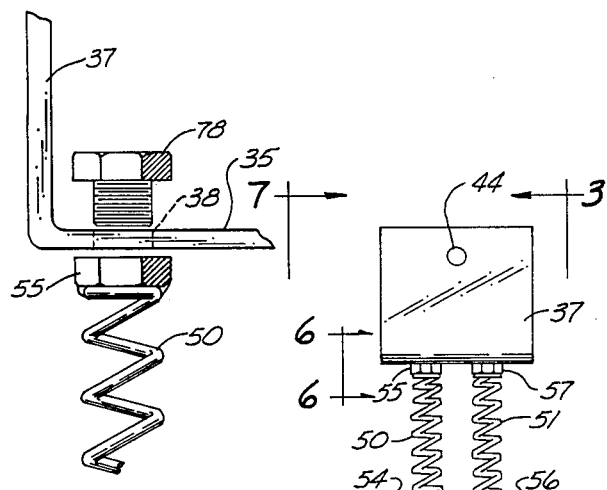
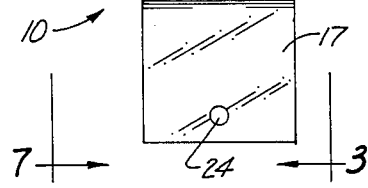

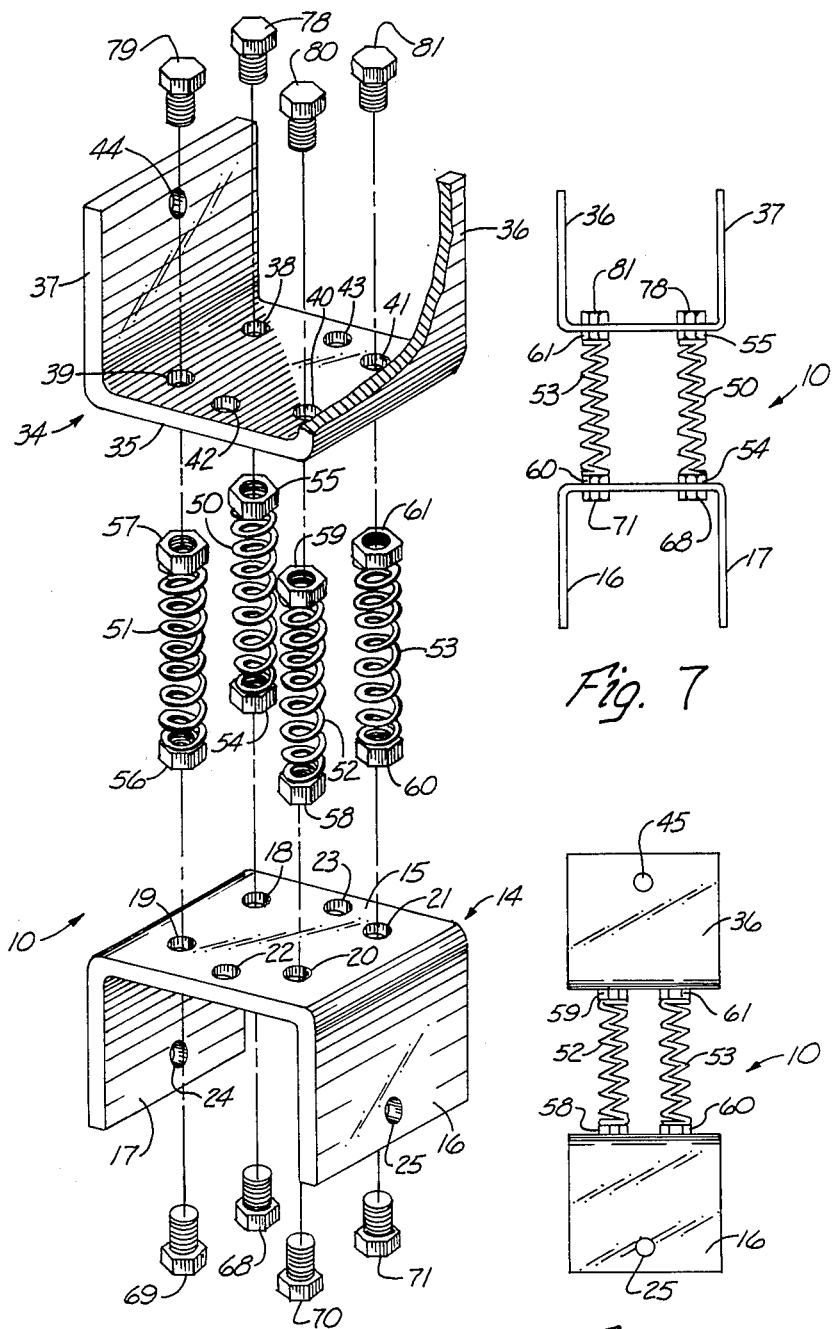

4,737,048

RESILIENT SIGN POST ATTACHMENT

TECHNICAL FIELD

The present invention relates generally to a road sign attachment and repair apparatus and more particularly to such an apparatus for connection to the post of a sign which prevents the road sign poles from being broken off.

BACKGROUND ART

The need for resiliently mounted sign posts is particularly apparent in those instances in which roadway signs are carried by posts, especially when they are placed in close proximity to vehicular traffic. Such posts are vulnerable to severe damage from impact with moving vehicles if they are of a conventional rigid structure. Not only is there considerable expense involved in the replacement of such posts, but the signs carried by the posts are frequently out of commission for long periods of time, thereby depriving travelers of the important information conveyed by the signs. This is particularly important in the case of intersection stop signs, for example, where the absence of instructional information presents a positive danger.

U.S. Pat. No. 3,875,720 shows a resilient mounting for sign posts which is adaptable for metal posts but is not easily adapted to wooden posts, which are far more common.

U.S. Pat. No. 2,949,324 shows a flexible sign post which requires the ends of the post to be flat and have a countersunk opening therein, a procedure which is difficult to do in the field.

Consequently, there is a need for a road sign attachment and repair apparatus for resiliently mounting posts which will solve the aforementioned problems.

DISCLOSURE OF THE INVENTION

The present invention relates generally to a road sign attachment and repair apparatus having first and second U-shaped brackets adapted to be attached to a wooden sign post near the bottom thereof to form a resilient joint or to form such resilient joint at a place where a wooden sign post has been broken off. Four coil springs are attached to one of the U-shaped brackets at one end thereof and to the other U-shaped bracket at the other end thereof.

An object of the present invention is to provide an improved flexible sign post.

Another object of the present invention is to provide an apparatus for easily and quickly repairing wooden sign posts which have been broken off.

A further object of the present invention is to provide a resilient structure which will prevent wooden sign posts from breaking since it forms a resilient joint which allows a vehicle to push the sign post and causes the sign post to return to an upright position when the vehicle is no longer in contact with the sign post.

Other objects, adavantages, and novel features of the present invention will become apparent from the following detailed description of the invention when considered in conjunction with the accompanying drawings.

BRIEF DESCRIPTION OF THE DRAWINGS

FIG. 1 is a perspective view of the present invention shown attached to a wooden road sign post and showing how it bends when it comes in contact with a vehicle;

FIG. 2 is a top view of the connection apparatus taken along line 2—2 of FIG. 3;

FIG. 3 is a side elevational view taken along line 3—3 of FIG. 5;

FIG. 4 is a bottom view taken along line 4—4 of FIG. 3;

FIG. 5 is a view taken along line 5—5 of FIG. 3;

FIG. 6 is an enlarged, partial, exploded view taken along line 6—6 of FIG. 5;

FIG. 7 is a side elevational view taken along line 7—7 of FIG. 5;

FIG. 8 is a side elevational view taken along line 8—8 of FIG. 3; and

FIG. 9 is a perspective, exploded view of the road sign attachment and repair apparatus in its preferred embodiment.

BEST MODES FOR CARRYING OUT THE INVENTION

Referring now to the drawings wherein like reference numerals designate identical or corresponding parts throughout the several views, FIG. 1 shows a road sign attachment and repair apparatus (10) shown connected to a post (11), which is embedded in the ground, and also to a top post (12) which would have a sign (not shown) attached thereto. A truck (13) is shown in contact with the post (12), causing it to bend to one side rather than breaking the posts (11 or 12).

Referring to FIG. 9, it is noted that a first U-shaped bracket (14) has a first planar horizontally disposed base plate (15) and a pair of first and second planar side plates (16 and 17) rigidly attached thereto. The base plate (15) has a plurality of first, second, third and fourth openings (18,19,20 and 21) and two more auxiliary openings (22 and 23) therein. The side plates (16 and 17) have aligned openings (24 and 25) extending therethrough.

A second U-shaped bracket (34) has a second planar horizontally disposed base plate (35) and upwardly extending third and fourth planar side plates (36 and 37) rigidly attached thereto. First, second, third and fourth openings (38,39,40 and 41) extend through the base plate (35). Two more auxiliary holes (42 and 43) also extend therethrough. Aligned openings (44 and 45) are disposed in the upwardly extending side plates (37 and 36), respectively.

First, second, third and fourth helical springs (50,51,52 and 53) are mounted at one end to the base plate (15) and at the other end to the base plate (35) by threaded fasteners. The first helical spring (50) has first and second threaded members (54 and 55) welded thereto. The second spring (51) has third and fourth threaded members (56 and 57) welded to the ends thereof. The third spring (52) has fifth and sixth threaded members welded thereto and the fourth spring (53) has seventh and eighth threaded nut members (60 and 61) welded to the ends thereof.

To assemble the apparatus (10), a first threaded fastener (68) extends through the first opening (18) and is threadably attached to the threaded member (54). In a similar fashion, second, third and fourth threaded bolt fasteners (69,70 and 71) extend through second, third and fourth openings (19,20 and 21) to threadably engage third, fifth and seventh threaded nut members (56,58 and 60), respectively.

To attach the second U-shaped member (34) to the coil spring structures (50,52 and 53), the fifth, sixth, seventh and eighth threaded bolt fasteners (78, 79, 80 and 81), respectively, extend through first, second, third and fourth openings (38, 39, 40 and 41) to threadably engage the threaded nut members (55, 57, 59 and 61), respectively.

Once the apparatus (10) is so assembled, then a hole must be drilled through the post (11), as shown in FIG. 1, so that a threaded nut and bolt fastener (26) can be placed therethrough and through the openings (24 and 25) in side plates (16 and 17) to hold the first U-shaped bracket (14) securely to the post portion (11) which is embedded in the ground. In a similar fashion, a hole must be drilled through the bottom of the post (12) to be in alignment with the openings (44 and 45) in side plates (36 and 37) so that a threaded nut and bolt fastener (46) can extend therethrough and through the openings (44 and 45) to securely hold the bottom of the post (12) in the position shown in FIG. 1 with respect to the second U-shaped bracket (34).

When the apparatus is so assembled, as shown in FIG. 1, it would normally hold the sign post (12) in a completely vertical position, but when a vehicle (13) contacts the post (12), it will allow it to bend over as shown in FIG. 1. When the vehicle (13) is no longer in contact with the post (12), the post (12) will return to its fully vertical position because of the force of the coil springs (50–53).

While the installation of the apparatus (10) is very useful as an original equipment sign post, it is also extremely useful as a repair apparatus. This is particularly true in the wintertime when the ground is frozen and a vehicle breaks off a sign post such as that illustrated in FIG. 1, assuming that the parts (11 and 12) constituted one solid post before it was broken off by a vehicle. That being the case, a hole would be drilled through the top of the post part (11) to align with openings (24 and 25) in the first U-shaped bracket (14) and a second opening would be drilled through the post portion (12) to align with the openings (44 and 45) in the second U-shaped bracket (34). Then nut and bolt fasteners (26 and 46) can be put in position and the sign post quickly and easily repaired without the necessity of trying to put a completely new sign post into the frozen ground. Not only does this quickly and easily repair the sign post (11 and 12), but it prevents it from being broken again, as in the original equipment design.

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. Road sign attachment and repair apparatus comprising:
   a first U-shaped bracket comprising:
   a first planar horizontally disposed base plate having a pair of opposing first and second edges, said first base plate having first, second, third, and fourth openings disposed therethrough;
   a first planar side plate rigidly attached to said first edge of said first base plate and extending vertically downwardly therefrom;
   a second planar side plate rigidly attached to said second edge of said first base plate and extending vertically downwardly therefrom;
   a second U-shaped bracket comprising:
   a second planar horizontally disposed base plate having an opposing pair of first and second edges, said second base plate having first, second, third and fourth openings extending therethrough;
   a third planar side plate rigidly attached to said first edge of said second base plate and extending vertically upwardly therefrom;
   a fourth planar vertically disposed side plate rigidly attached to said first edge of said second base plate and extending vertically upwardly therefrom;
   a first helical spring having first threaded member attached to one end thereof and a second threaded member attached to the other end thereof;
   a second helical spring having a third threaded member attached to one end thereof and a fourth threaded member attached to the other end thereof;
   a third helical spring having a fifth threaded member attached to one end thereof and a sixth threaded member attached to the other end thereof;
   a fourth helical spring having a seventh threaded member attached to one end thereof and an eighth threaded member attached to the other end thereof;
   first threaded fastener means extending through said first opening in said first base plate and threadably engaging said first threaded member for holding said first threaded member to said first base plate;
   second threaded fastener means extending through said second opening in said first base plate and threadably engaging said third threaded member for holding said third threaded member to said first base plate;
   third threaded fastener means extending through said third opening in said first base plate and threadably engaging said fifth threaded member for holding said fifth threaded member to said first base plate;
   fourth threaded fastener means extending through said fourth opening in said first base plate and threadably engaging said seventh threaded member for holding said seventh threaded member to said first base plate;
   fifth threaded fastener means extending through said first opening in said second base plate and threadably engaging said second threaded member for holding said second threaded member to said second base plate;
   sixth threaded fastener means extending through said second opening in said second base plate and threadably engaging said fourth threaded member for holding said fourth threaded member to said second base plate;
   seventh threaded fastener means extending through said third opening in said second base plate and threadably engaging said sixth threaded member for holding said sixth threaded member to said second base plate;
   eighth threaded fastener means extending through said fourth opening in said second base plate and threadably engaging said eighth threaded member for holding said eighth threaded member to said second base plate;
   a first post with planar sides, having the bottom adapted to be disposed in the soil and the top extending above the soil and having a top and first and second sides, said first base plate being disposed on said top and said first and second side plates extending adjacent to said first and second sides, respectively;

means for attaching said first and second side plates to said first post;

a second post having a top adapted to have a sign connected thereto and a bottom, said second base plate being adjacent to and just below said bottom and said third and fourth side plates extending on each side of said second post adjacent the bottom thereof; and means for attaching said third and fourth side plates to said second post whereby when said top post is pushed to one side, said first, second, third and fourth springs will flex to allow the second post to pivot with respect to said first post.

2. Road sign attachment and repair apparatus comprising:

a first U-shaped bracket comprising:

a first planar horizontally disposed base plate having a pair of opposing first and second edges;

a first planar side plate rigidly attached to said first edge of said first base plate and extending vertically downwardly therefrom;

a second planar side plate rigidly attached to said second edge of said first base plate and extending vertically downwardly therefrom; a second U-shaped bracket comprising:

a second planar horizontally disposed base plate having an opposing pair of first and second edges;

a third planar side plate rigidly attached to said first edge of said second base plate and extending vertically upwardly therefrom;

a fourth planar vertically disposed side plate rigidly attached to said second edge of said second base plate and extending vertically upwardly therefrom;

a first helical spring having top end and a bottom end;

a second helical spring having top end and a bottom end;

a third helical spring having a top end and a bottom end;

a fourth helical spring having a top end and a bottom end;

means for rigidly attaching the bottom ends of said first, second, third and fourth helical springs to the top of said first base plate;

means for rigidly attaching the top ends of said first, second, third and fourth springs to the bottom of said second base plate;

a first post with planar sides, having the bottom adapted to be disposed in the soil and the top extending above the soil and having a top and first and second sides, said first base plate being disposed on said top and said first and second side plates extending adjacent to said first and second sides, respectively;

means for attaching said first and second side plates to said first post;

a second post having a top adapted to have a sign connected thereto and a bottom, said second base plate being adjacent to and just below said bottom and said third and fourth side plates extending on each side of said second post adjacent the bottom thereof; and means for attaching said third and fourth side plates to said second post whereby when said top post is pushed to one side, said first, second, third and fourth springs will flex to allow the second post to pivot with respect to said first post.

* * * * *